Patented Feb. 9, 1954

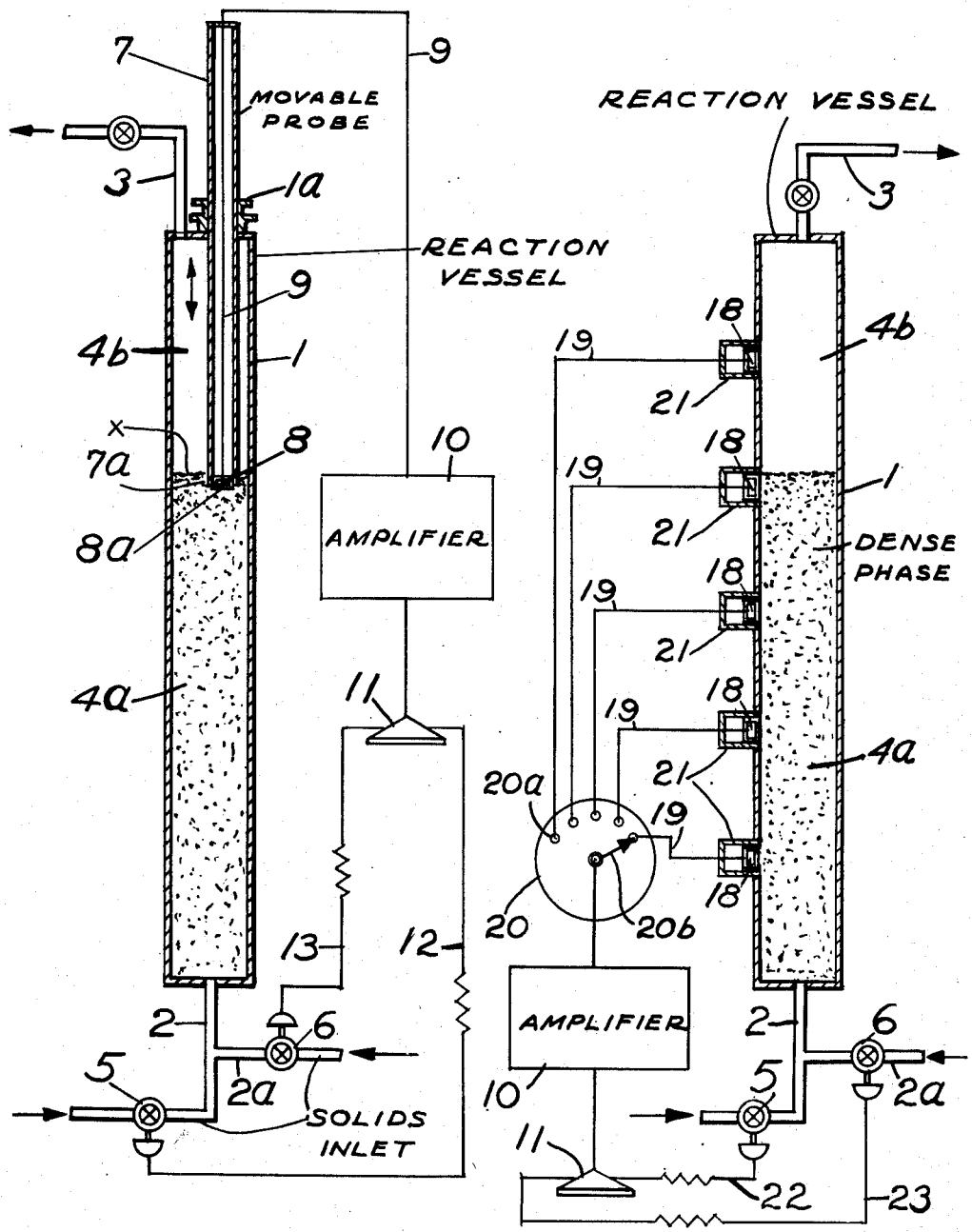

2,668,365

UNITED STATES PATENT OFFICE 2,668,365

APPARATUS FOR DETERMINING DENSITIES OF FINELY DIVIDED SOLID MATERIALS IN A FLUIDIZED BODY OF SUCH MATERIALS

David R. Hogin, Scarsdale, N. Y., assignor to Standard Oil Development Company, a corporation of Delaware Application December 31, 1949, Serial No. 136,344

9 Claims. (Cl. 34—57)

The present invention relates to apparatus for determining the density of fluidized solid materials at any level in a body of such materials. More particularly, it relates to the determination of an interfacial level between dense and dispersed phases of a body of fluidized solid materials. With further particularity, the invention relates to the use of impact sensitive means for such determinations, in which the difference in excitation of such means by impact of moving solid particles in one phase, from the excitation produced in another phase may be registered so as to permit comparison, one with another or with a predetermined constant.

In the handling of finely divided, solid materials, particularly where such materials may be maintained in a vessel or conduit as a body of finely divided solid particles, fluidized by the injection of gaseous materials into the body of solids, there is a tendency for the solid material to be dispersed in the gaseous materials to a different degree from the bottom to the top thereof. Ordinarily, it is found that in the lower part of the vessel the density of the fluidized body of material is greater than in the upper part, and that at some level in the body of materials there will be a recognizable interface between a comparatively dense phase of fluidized solids and a less dense or dispersed phase above it. Within both dense and dispersed phases of the fluidized body of finely divided solid materials, individual solid particles are in substantially constant motion under the influence and effect of passage of the gaseous fluidizing medium through the vessel. It is an object of the present invention to provide means whereby the interfacial level between the dense and dispersed phases of fluidized solid particles may be located within a comparatively narrow range of distance, and with some degree of accuracy. It is also an object of the invention to provide means whereby differences in density from top to bottom of a body of such fluidized solid materials may be determined.

The invention and its objects may be more fully understood from the following specification when read in conjunction with the accompanying drawings in which:

Fig. 1 is a semi-diagrammatic view, in vertical section through a vessel containing a body of fluidized solids and illustrating the employment of one form of the invention, and Fig. 2 is a similar view illustrating another form of the invention.

In the apparatus as illustrated in Figures 1 and 2, the numeral 1 designates a vessel, such as a reaction vessel, for contacting finely divided solid materials with a gaseous reactant, and fluidizing material. The numerals 2 and 3 designate inlet and outlet lines for passing a gaseous reactant material through the vessel, in conjunction with finely divided solid materials, and the numerals 4a and 4b the dense and dispersed phases of a body of finely divided solid material fluidized by the gaseous material passed through the vessel by way of the lines 2 and 3, or otherwise. Additional solids may be introduced into the vessel 1 as required, by way of the line 2a opening into inlet line 2, the lines 2 and 2a being provided with control valves 5 and 6 respectively.

In the form of the invention illustrated by Fig. 1, the vessel is provided with a plumb rod, or movable probe. This is shown as a hollow rod 7, having an open lower end 7a in which is disposed an impact sensitive element 8 mounted for fluid-tight relation with the rod, sealing the lower end thereof, and exposed to impact of individual particles of the body of materials contained in the vessel. The element 8 may be any suitable impact sensitive element such as a microphone, or a quartz crystal unit, preferably enclosed in a protective casing 8a. The probe or plumb rod 7 enters the vessel 1 through a slip joint fitting 1a, or any other type of fitting designed to provide a fluid- and pressure-tight seal between the rod 7a and the vessel 1, while permitting reciprocal movement of the rod vertically of the vessel. The impact sensitive element 8 is connected as by means of a transmission line 9 to an electrical amplifying unit 10, by means of which excitation of the impact sensitive element by impact of particles of the solid material contained in the vessel against the element, or the case 8a therefor, is amplified to such an extent as to be registerable electrically.

Various means for registering the effect of excitation of the element 8 may be employed. As shown in Figure 1, the numeral 11 designates such a means illustrated diagrammatically and which may be a typical loud speaker unit, converting the amplified effect of excitation to audible sound; a voltmeter, registering changes in voltage in the electrical system as produced by the effect of excitation; a recording instrument, producing a graphical record of such excitation; or a control mechanism, actuated by the amplified effect of such excitation, to operate control elements such as valves 5 and 6 in either or both of the supply lines 2 and 2a for the gaseous reactant or fluidizing material, and for finely divided solid materials, respectively. In an automatic system, any suitable means for operating the valves 5 and 6 may be provided, such as electrically or pneumatically driven motorized valves. In either instance, such valve operating means may be connected as by lines 12 and 13 respectively to a suitable registering or control mechanism and actuated by the amplified effect of excitation of elements 8.

In operation of the apparatus as illustrated by Fig. 1, a body of finely divided solids in the vessel 1 is maintained in a fluidized condition by introduction of a gaseous material through the supply line 2, establishing in the lower portion of the vessel a dense phase 4a of finely divided solid materials, and a dispersed phase 4b of such materials in the upper portion of the vessel. To determine the level of an interface $x$ between phases 4a and 4b, the plumb rod or probe 7 may be moved in either direction, vertically of the vessel, until a difference in the excitation effect on the element 8 is noted and registered by means of the amplifier 10 and element 11. With the individual particles of solid materials in substantially constant motion, produced by fluidization of the body of such materials by gaseous materials passed through the vessel 1, excitation of the sensitive element results from such particles striking against the element 8 or the casing 8a therefor. The greater the number of particles in a given zone, the greater the excitation effect, producing a direct indication of the density of the solid particles in the given zone. A relatively sharp change in excitation of element 8 will indicate an interfacial level between phases, while relatively small changes above or below such level will indicate variations in density within either phase. By suitable calibration of the plumb rod, the level of the impact sensitive element in the vessel, and thereby the interfacial level between phases of the body of finely divided solid materials, may be determined as a measured distance from either the top or bottom of the vessel. Likewise, with the movable probe adjusted and fixed so as to locate the impact sensitive element 8 at a predetermined level, variations in the amplified effect of excitation of the element 8 by impact of the finely divided solid materials particles may be utilized through the element 11 to actuate controls such as valves 5 and 6 regulating the flow of a gaseous fluidizing material through line 2, and a finely divided solid material through line 2a, so as to maintain the interfacial level between the dispersed and dense phases in the vessel 1 at substantially the predetermined level of the impact sensitive element 8.

In the form of the apparatus illustrated by Fig. 2, a plurality of impact sensitive elements 18 are disposed in vertically spaced relation along the wall of the vessel 1, each element being connected by a series of transmission lines 19 to individual contact points 20a in a selector switch 20. As shown, the switch is provided with a movable switch arm 20b, connected at one end to an amplifier unit 10, and adapted for selective movement to bring the other end into contact with any of the contact points connected to the respective transmission lines 19. The impact sensitive elements 18, as shown in Fig. 2, may be of the same nature and construction as described with reference to Fig. 1. These elements may be permanently affixed to either the inner or outer surface of the vessel wall, or, as shown, may be inserted in fluid-tight relation to the open inner end of a series of tubular housing elements 21 let into the vessel wall. The selector switch 20 may be of any conventional form, such as a manually operated switch in which a selector switch arm 20b may be moved periodically from one contact point 20a to another, or a motor driven switch in which the switch arm 20b is continuously or intermittently rotated so as to make contact with each of the contact points in succession.

In operation of the apparatus, as illustrated in Fig. 2, by rotating the selector switch arm 20b, each contact point 20a may be brought into circuit connection with the amplifier 10 and the registering means 11. As each such circuit is established, the excitation of a corresponding impact sensitive element in the vessel 1 is registered by the element 11. By selecting any two impact sensitive elements as determining the upper and lower limit of one phase or the other, the transmitted and amplified effect of excitation of these sensitive elements may be compared, through the registering means 11, so as to indicate an interfacial level within the range determined by the spacing of the sensitive elements 18. Should the interface drop below the lower of the two elements, the comparison between these elements would show them to have substantially the same excitation value. Should the level rise above the upper one of such elements, a similar effect would be produced but the intensity or degree of excitation would be higher due to the greater density of the fluidized solid particles below the interfacial level than above.

In an automatic system, such differences may be utilized to actuate control elements such as the valves 5 and 6 in the lines 2 and 2a respectively, as by means of motorized valve operating devices energized by electrical or pneumatic connections 22 and 23 respectively with a suitable registering element 11. By providing a motor driven switch arm for the selector switch 20, control of the interfacial level may be made completely automatic.

In addition, the system, as illustrated by Fig. 2, is particularly adapted to register and/or record and control specific density of the finely divided solid material, particularly within the dense phase 4a. This may be accomplished by a predetermination or calibration of the reaction of the sensitive elements to the impact of solid particles in suspensions of predetermined densities and gas velocities. With such calibration, the excitation of the sensitive elements, as registered in operation of the system, may be compared with the predetermined values previously established so as to permit increase or decrease of the density of the solid particles in any given zone within the phase, by regulation of the introduction of either or both fluidizing gaseous material or finely divided solid materials through the lines 2 and 2a respectively.

Calibration of the sensitive elements may be accomplished by any conventional means, such as an electrical filter circuit and voltmeter. The voltage recorded in this fashion will be a function of the energy induced in an impact sensitive element. This in turn will be a function of the number of particles striking the element per unit of time, their velocity, and their masses. By registering the effect of a known quantity of solids, of known particle size composition, fluidized and agitated by a specific gaseous material introduced into a container for the solids and gaseous material at a controlled flow rate and velocity, a predetermined constant may be established for any desired process requirement.

What is claimed is:

1. In a vessel adapted to contain a body of finely divided solid materials fluidized and suspended in a stream of a gaseous medium passed through said vessel, and in which individual particles of said solid materials are in substantially constant motion, a means for determining the density of said solids in said medium at any given level vertically of said vessel, comprising at least one closed casing having a substantially rigid face member disposed with relation to said vessel so as to expose said rigid face member to the impact of solid particles in motion within said vessel, means substantially contained within said casing for sensing the frequency and magnitude of the impact of said solid particles against said face member exposed thereto, said sensing means being disposed in spaced relation to said face member within the casing and being excitable by impact of said solid particles against the face member, electrical means for transmitting and amplifying excitation of said sensing means, electrical means for registering the amplified effect of such excitation, and means to vary the effective location of said sensing means vertically of said vessel.

2. Apparatus according to claim 1, in which the means for sensing the frequency and magnitude of the impact of said solid particles against the closed casing face member exposed thereto is at least one microphone element.

3. Apparatus according to claim 1, in which the means for registering the amplified effect of excitation of said sensing means is a vibratory sound producing element.

4. Apparatus according to claim 1, in which the means for registering the amplified effect of excitation of said sensing means is a voltmeter adapted to register changes in electric voltage produced by excitation of said sensing means.

5. In a vessel adapted to contain a body of finely divided solid materials fluidized and suspended in a stream of a gaseous medium passed through said vessel, and in which individual particles of said solid materials are in substantially constant motion, a means for determining the density of said solids in said medium at any given level vertically of said vessel, comprising a plumb rod having an upper end and a lower end, extended downwardly into said vessel and reciprocally movable vertically thereof, a closed casing carried by said plumb rod at the lower end thereof, said casing having a substantially rigid face member exposed interiorly of the vessel to the impact of solid particles in motion therein, a means disposed within said casing in spaced relation to said face member for sensing the frequency and magnitude of the impact of said solid particles against said rigid face member, which means is excitable by such impact, electrical means for transmitting and amplifying excitation of said sensing means, and electrical means for registering the amplified effect of such excitation.

6. In a vessel adapted to contain a body of finely divided solid materials fluidized and suspended in a stream of a gaseous medium passed through said vessel, and in which individual particles of said solid materials are in substantially constant motion, a means for determining the density of said solids in said medium at any given level vertically of said vessel, comprising a series of closed casings disposed in longitudinally spaced relation vertically of the vessel each of said casings having a rigid face member exposed interiorly of said vessel to the impact of solid particles in motion therein, a series of means for sensing the frequency and magnitude of the impact of said solid particles against said face members of each of said series of casings exposed thereto and excited by such impact in which each of said series of sensing means is substantially contained within one of said series of casings, and disposed therein in spaced relation to said rigid face member individual means for transmitting the effect of excitation of each sensing means by the impact of moving particles against said exposed casing surface portion, said transmission means connected in parallel to said sensing means, electrical means for amplifying such effect, electrical means for registering the amplified effect of excitation of individual sensing means, a selector switching means connected between the said individual transmission means and said means for amplifying the effect of excitation of said sensing means, whereby the effective level of excitation may be varied vertically of said vessel, and electrical means for registering the amplified effect of excitation of any sensing means in said series.

7. Apparatus according to claim 6, in which said selector switching means is a rotatable conductor element connected directly to said amplifying means, said element adapted to make contact with each of said transmission means in succession closing an electrical circuit between each of said means and the amplifying means in sequence.

8. An apparatus according to claim 6 in which each of said series of closed casings is individually secured to an outer surface portion of the vessel wall and in which said wall forms the rigid face member of each casing exposed interiorly of said vessel.

9. In a vessel adapted to contain a body of finely divided solid materials fluidized and suspended in a stream of a gaseous medium passed through said vessel and in which individual particles of said solid materials are in substantially constant motion, a means for determining the density of said solids in said medium at any given level vertically of said vessel, comprising a series of tubular housing elements each opening at one end through a wall of said vessel, said housing elements disposed in longitudinally spaced relation vertically of the vessel, a series of closed casings each having a rigid face member each of said casings disposed within a housing element, at the open end thereof, so as to expose the rigid face member of each casing interiorly of said vessel to the impact of solid particles in motion therein, a series of means for sensing the frequency and magnitude of the impact of said solid particles against the face member of each of the said casings exposed thereto each of which means is excited by such impact and is substantially contained within a casing in said series disposed in spaced relation to the rigid face member thereof, individual means for transmitting the effect of excitation of each sensing means by the impact of moving particles against said exposed casing face member, said transmission means connected in parallel to said several sensing means, electrical means for amplifying such effect, a selector switching means connected between the said individual transmission means and said means for amplifying the effect of excitation of said sensing means, whereby the effective level of excitation may be varied vertically of said vessel, and electrical means for registering the amplified effect of excitation of any sensing means in said series.

DAVID R. HOGIN.

References Cited in the file of this patent

UNITED STATES PATENTS

| Number | Name | Date |
|---|---|---|
| 1,281,013 | Humphreys | Oct. 8, 1918 |
| 1,616,547 | Pontoppidan | Feb. 8, 1927 |
| 1,887,739 | Mott-Smith | Nov. 15, 1932 |
| 2,271,148 | Becker et al. | Jan. 27, 1942 |
| 2,398,958 | Pellettere | Apr. 23, 1946 |
| 2,436,464 | Van Dornick | Feb. 24, 1948 |
| 2,448,553 | Schutte et al. | Sept. 7, 1948 |
| 2,465,628 | Border | Mar. 29, 1949 |